July 15, 1924.
H. E. TRUAX
MOTOR METER LENS
Filed Sept. 22, 1921
1,501,504
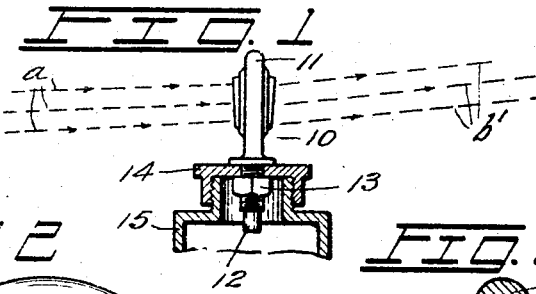
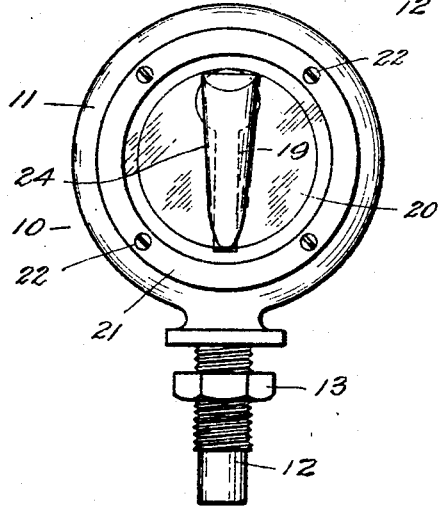
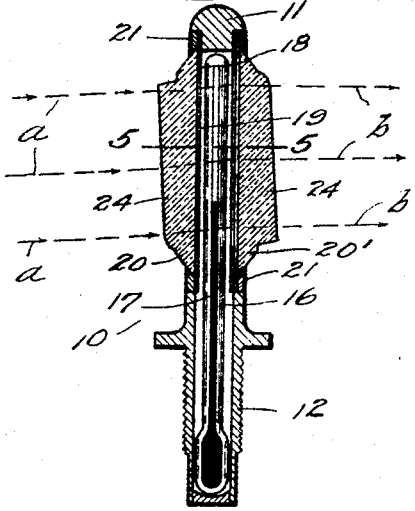
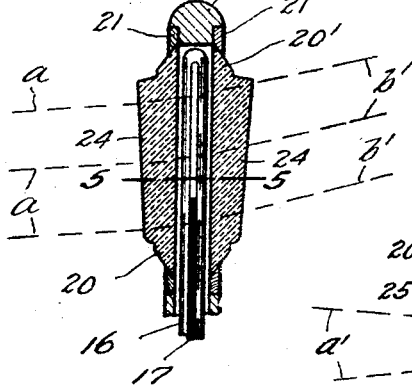
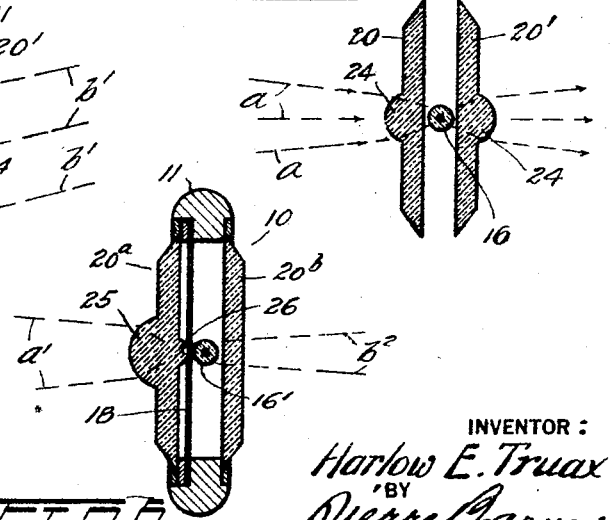
INVENTOR:
Harlow E. Truax
BY
Pierre Barnes
ATTORNEY Patented July 15, 1924.

1,501,504

UNITED STATES PATENT OFFICE.

HARLOW E. TRUAX, OF BREMERTON, WASHINGTON.

MOTOR-METER LENS.

Application filed September 22, 1921. Serial No. 502,452.

*To all whom it may concern:*

Be it known that I, HARLOW E. TRUAX, a citizen of the United States, residing at Bremerton, in the county of Kitsap and State of Washington, have invented certain new and useful Improvements in Motor-Meter Lenses, of which the following is a specification.

This invention relates to automobile-motor thermic meters of the type illustrated and described in United States Patent No. 1,275,654 issued August 13, 1918.

When such meters are used in night driving the headlight rays which are reflected from the road surface which is illuminated by the headlights are relied upon to render the thermometer of the meter discernible to the driver of the car to which it is applied.

By reason, however, of the thermometer being located in such a relatively large field of moderate light it cannot with the devices hitherto in use be readily readable by the driver for indicating temperature variations.

The object of my invention is the provision upon said meters of improved lens devices whereby the reflected light above referred to is concentrated in a vertical beam upon the thermometer tube to illuminate the same so that the liquid contained therein is clearly discernible from the driver's seat.

Other objects and advantages of the invention will appear in the following specification.

The invention consists in the novel construction of light refracting and concentrating lens devices hereinafter described and claimed.

In the accompanying drawings,—

Figure 1 is a side elevational view of an embodiment of my invention applied to a thermic indicator attached to an automobile radiator which is shown in longitudinal vertical section. Fig. 2 is a front elevational view of the indicator provided with my improved devices. Fig. 3 is a longitudinal vertical section of Fig. 2. Fig. 4 is a fragmentary view of the indicator, with the lenses disposed in different relations from those shown in Fig. 3. Fig. 5 is a horizontal sectional view through 5—5 of Figs. 3 and 4 with the casing omitted. Fig. 6 is a horizontal sectional view of the indicator to illustrate a modified form of my invention.

In said drawings, the reference numeral 10 designates generally a heat indicator having an annular frame portion 11 provided with a hollow stem 12 which is exteriorly screw threaded to be engaged by a nut 13 whereby the indicator is rigidly secured to the cap 14 of an automobile radiator 15.

Provided centrally within the frame 11 is a vertically disposed thermometer tube 16 containing a liquid heat indicating medium 17. 18 represents a partition, shown in Fig. 3, which is located to the front or rear of the tube 16 and having a vertical slot or sight opening 19.

Said frame is provided about its inner periphery with recesses to receive front and back glass plates or lenses 20, $20^1$ which are secured in place as by rings 21 through the medium of screws 22.

Excepting the lenses, the parts above referred to are or may be similar to those now employed in heat indicators of the character described.

Referring now to Figs. 1 to 5, inclusive, the present invention is carried out by the provision of two similar lenses for the front and the rear, respectively, of the frame. Said lenses are each formed of a circular glass disc portion, preferably with a beveled periphery, and formed or provided on its outer face with a vertical ridge element 24 which is located centrally of the plate. As shown in Figs. 2 and 5 the ridge element 24 of a lens is in the form of a segment of a cone whose axis is disposed vertically, or nearly so.

The front lens 20 is disposed to have the ridge 24 thereof with its end of larger radius at the top so that the light rays, as denoted by dotted lines $a$ in Figs. 1, 3 and 4, which are reflected from the road surface in front of the vehicle will be refracted upwardly in passing through the ridge 24 to the thermometer tube 16.

By reason of the ridge of the lens at the front being of a convex shape in horizontal section the rays $a$ are thereby caused to converge (see Fig. 5) into a narrow vertical beam at approximately the center of the thermometer tube to brightly illuminate the same so that the elevation of the temperature indicating medium therein will be clearly distinguished. The rear lens $20^1$ of a meter is disposed to have the ridge 24 thereof with its thicker end at the bottom, or top, as in Figs. 3 and 4 respectively, according to the elevation of the meter with respect to the eyes of the driver in order to have the light rays transmitted through the meter refracted downwardly as indicated by dotted lines $b$ in Fig. 3, or upwardly as indicated by $b^1$ in Fig. 4.

The horizontal convexity of the ridge of the rear lens $20^1$ serves, moreover, to magnify horizontally the apparent size of the indicating medium in the tube 16 as will be understood from Fig. 5.

From the foregoing it will be apparent that the above described embodiment of the invention affords a concentrated or bright vertical beam of light on the thermometer tube through the instrumentality of the ridge of the front lens, while the ridge of the rear lens serves as a magnifier and may be adjusted in the frame to direct the light rays to the driver's eyes.

In the modified form of the invention shown in Fig. 6, the rear lens $20^b$ is preferably a plane disc with a beveled periphery.

The front lens $20^a$, however, is provided with two centrally disposed vertical ridges 25 and 26 at the front and back respectively. The front ridge 25 being of a segment of a cone with its thicker end uppermost as explained with reference to the ridge 24 aforesaid of a lens 20.

The back ridge 26 is convex in horizontal section and desirably of the same diameter throughout its length.

In operation the two ridges 25 and 26 contribute to cause the light rays $a^1$, Fig. 6, to be focused on the thermometer tube $16^1$ and thence directed in slightly diverging directions as denoted by $b^2$ to the driver.

The invention is readily applied to a meter and increases the value of the same by rendering the indicating medium more clearly discernible at all times especially at night.

I do not wish to be understood as confining myself to the specific construction illustrated and described as changes may be made thereto without departing from the spirit of the invention as defined in the appended claims.

What I claim, is,—

1. In a meter of the class described, a lens having centrally thereof a forwardly protruding vertically arranged ridge having the shape of a segment of a cone whereby light rays passing through the ridge are refracted vertically.

2. In a meter of the class described, a circular lens having diametrically thereof a protruding convex vertical ridge for converging light rays passing through said ridge into a vertical beam of light, said lens being plane at each side of said ridge.

Signed at Seattle, Washington, this 17th day of September, 1921.

HARLOW E. TRUAX.

Witnesses:
PIERRE BARNES,
MARGARET G. SUPPLE.